July 11, 1944.  A. DOHERTY  2,353,447

METHOD OF PRODUCING STRUCTURAL ELEMENTS

Filed Aug. 26, 1941  2 Sheets-Sheet 1

ARTHUR DOHERTY,
INVENTOR.

BY Stuart M. Maule

ATTORNEY.

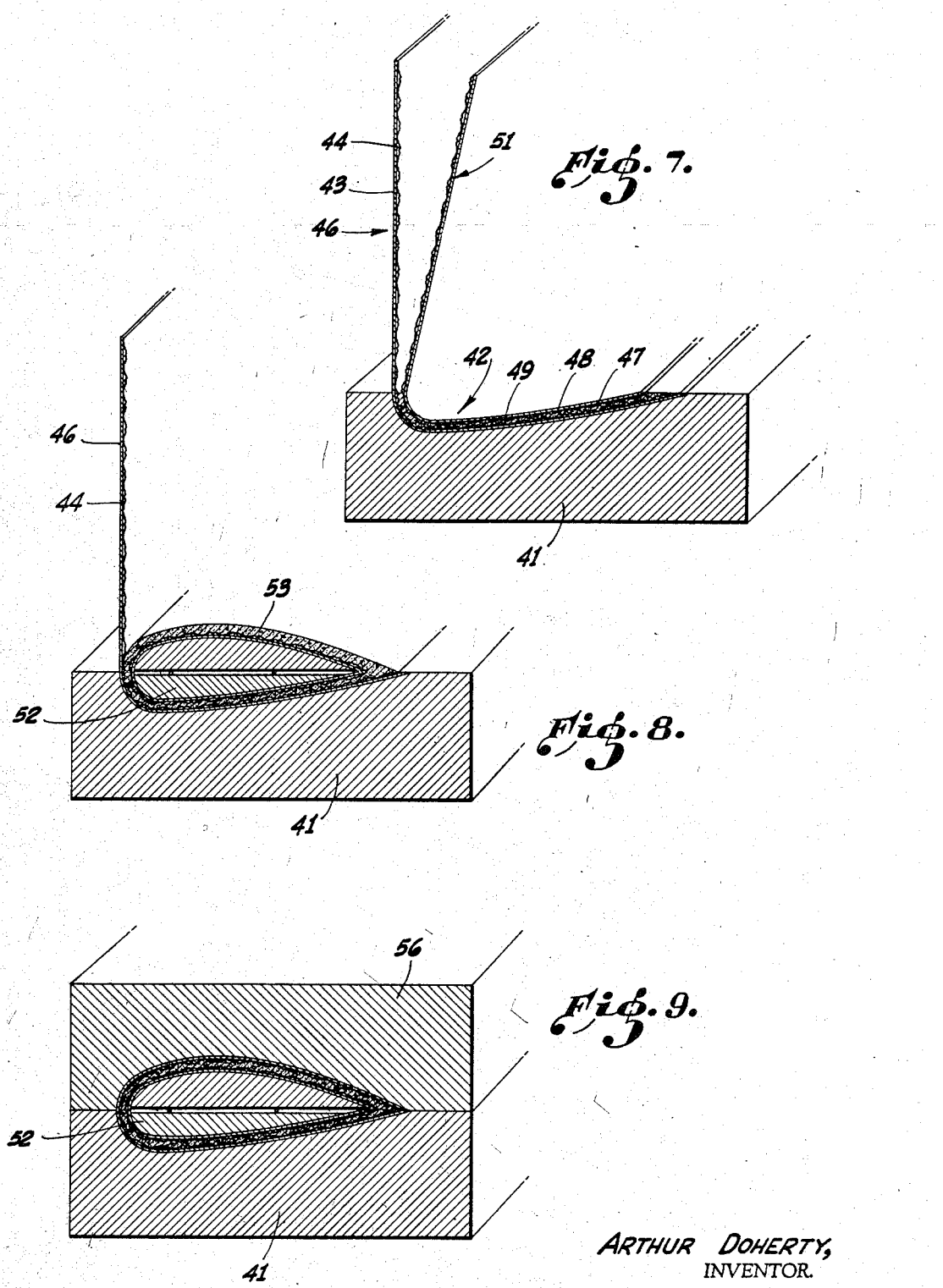

Patented July 11, 1944

2,353,447

UNITED STATES PATENT OFFICE 2,353,447

METHOD OF PRODUCING STRUCTURAL ELEMENTS

Arthur Doherty, Los Angeles, Calif.

Application August 26, 1941, Serial No. 408,340

3 Claims. (Cl. 154—2)

This invention relates to fabricated structures, and more particularly to structural units adapted to be assembled and joined together to provide a fabricated structure such as a building or a vehicle.

An object of my invention is the provision of a structural unit which is particularly adapted for, but which is not necessarily limited to, service as a unit of aircraft construction, since it is characterized by such features as great strength in proportion to weight, without, however, undue sacrifice in resilience, the elimination of interior bracing from hollow constructions such as wing sections and fuselage sections, and an almost perfectly smooth exterior surface substantially completely devoid of the irregularities unavoidably present in more conventional constructions, such as protruding rivet heads, or even the almost microscopically small interstices between the heads of countersunk rivets and the complementary sockets or recesses in the wing surface in which they fit. One of the problems encountered in the design of a modern, high speed airplane which is familiar to those skilled in the study of aerodynamic efficiency, is concerned with the elimination of as much "drag" as possible, so as to minimize the amount of power which is wasted in overcoming the friction of air against the surfaces of the ship, and thereby permit the greatest possible part of the energy of the propeller's thrust to be used actually to drive the ship forward. Experimentation has proved that a certain part of the drag, called "induced drag," is essential since it is caused by the downrush of air from the wing and the vortices of air at the wing tips which are the inevitable result of the lift imparted to the wing during its forward movement through the air. But such "induced drag" accounts for about only 40% of the total drag. The endeavor to reduce the remaining 60%, which is called "parasite drag," is one of the matters now receiving the attention of aircraft designers. Tests under both wind tunnel and actual flight conditions have shown that in the design of high speed aircraft such seemingly slight interruptions in the smooth flow of air over the airfoil surface as protruding rivet heads, or even countersunk rivets seriously lower the efficiency of streamlining; and therefore, the present invention, since it provides highly effective and efficient means for anchoring the surface sheeting of an airfoil without rivets or other fastening means which interfere with its smooth exterior surface, is believed to represent a valuable advance in aircraft design.

A further object in this same connection is the provision of a novel and highly efficient method of manufacture of my improved structural unit, which contributes towards its low cost and its adaptability for high speed, quantity production.

The invention possesses other objects and valuable features, some of which, with those enumerated, will be set forth in the following description of the preferred embodiment of my invention illustrated in the drawings accompanying and forming part of the specification. It is to be understood that I do not limit myself to the showing made by the said drawings and description as I may adopt variations of the preferred form within the scope of my invention as set forth in the claims.

Referring to the drawings.

Figures 7, 8, and 9 illustrate diagrammatically three steps in the production of a wing section in accordance with the method of the present invention.

Figure 6:
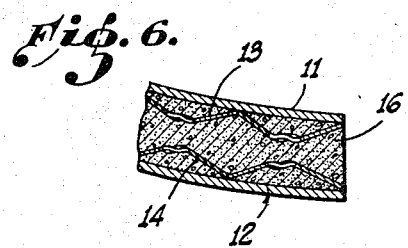
Figure 6 is an enlarged detailed view taken through a completed unit constructed in accordance with the principles of present invention.
Figure 5:
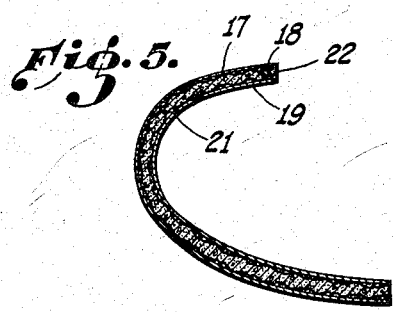
Figure 5 is a view similar to Fig. 4 but showing the interior facing sheet applied thereto.

The structural unit of the present invention constitutes an improvement over that forming the subject matter of Patent Number 2,154,036 issued to me on April 11, 1939, inasmuch as it bears a certain amount of basic similarity thereto but embodies improvements thereover which result in it being adapted for, but not necessarily limited to, use in the construction of high speed airplanes. In terms of broad inclusion the constructional unit of the present invention comprises two spaced, parallel, facing sheets, preferably of metal to the interior faces of which metal lath is permanently secured as by spot welding at frequent intervals throughout the entire area of the facing sheet. The metal lath is embedded within cementitious grouting material such as the ordinary cement in which tile is conveniently set; and the unit can be formed in any size and shape as determined by the desired configuration for the ultimate constructional unit. I have found that by constructing the unit to extend in more than one plane, i. e., in planes extending angularly with respect to each other a type of construction is provided which is possessed of great strength in proportion to its weight, which feature naturally suggests its adaptability for use in aircraft construction. Fig. 6 illustrates the interrelationship between parts of a constructional unit produced in accordance with the principles of the present invention. The unit comprises two opposed parallel facing sheets 11 and 12 respectively of suitable material such as sheet aluminum, dural, or any of the sheet metals conventionally employed in aircraft manufacture. A sheet of metal lath, 13 and 14 respectively is affixed permanently and rigidly to the interior surface of the sheets 11, 12 of facing metal preferably by spot welding at frequent intervals throughout the entire area of the facing. The remainder of the space between the facing sheets 11 and 12 is entirely filled with cementitious grouting material 16 with the result that the metal lath 13, 14 is embedded within this grouting 16. Accordingly, after the grouting 16 has hardened, the resulting unit is of solid monolithic nature faced with smooth metal sheet so firmly and permanently interconnected that it is, for all practical purposes, a one-piece construction.

Although this construction may be quite thin, it is possessed of great inherent strength. As an analysis of the reasons for this consider the effect of such a structure of subjecting it to bending movement. The facing sheet 12 which is on the outside of the bend thus produced will be subjected to tension, and being of metal, and presumably one of the highly developed alloys now being used so advantageously in aircraft construction will possess an extremely high tensile strength. On the other hand the grouting material constituting the major portion of the remainder of the thickness of the unit will be subjected to compression, hence, the desirability of cementitious material such as concrete for this portion of the unit than which few materials are better qualified to resist compression stresses of great magnitude. However, a peculiarity which I have noticed of a constructional unit produced as hereinabove described is that while it is possessed of great strength such strength is not of the rigid unyielding type but on the contrary it is characterized by a relatively high degree of resilience, with the result that a constructional unit built in accordance with the principles of the present invention with all its being very strong and light still is not brittle or frangible but on the contrary is very tough and capable of resisting shock to such a degree that this is another factor which contributes towards its desirability as a unit of aircraft construction.

Probably the most outstanding characteristic of my invention as far as adaptability of the resultant construction for use as a component part of an airplane is concerned, is the extreme smoothness of the exterior surface of the unit which is made possible by the complete avoidance of rivets or other means for anchoring the metal surface sheet to the remainder of the construction without forming any irregularities in that exterior surface. Since the metal lath 13, 14 is welded to the interior surface of the metal sheets 11 and 12 no riveting or the like is necessary; and yet, the fact that the metal lath is embedded within the monolithic grouting 16 results in the development of an extremely rigid unitary construction from which it is practically impossible to strip the metal facing 11, 12. After the grouting 16 has hardened the exterior surfaces of the metal facings 11, 12 can be polished so that in addition to being devoid of any protuberances such as rivet heads and the like a highly polished surface can be imparted thereto which further enhances its desirability for aircraft use.

Figure 2:
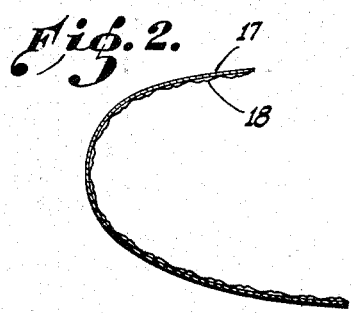
Figure 2 is a large detailed view in longitudinal, vertical section taken through the facing sheet which is to be used in the construction of the leading edge of a wing section.
Figure 3:
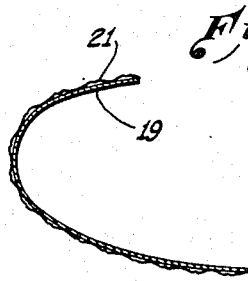
Figure 3 is a view similar to Fig. 2 taken through the cooperative facing sheet intended to provide the interior surface for the same portion of the wing section.
Figure 4:
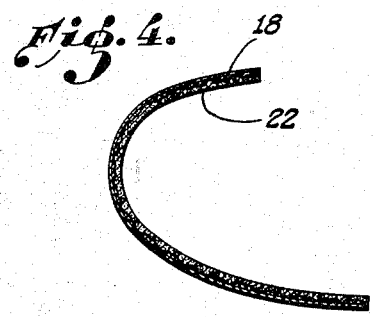
Figure 4 is a view similar to Fig. 2 but showing the grouting applied to the interior of the facing sheet placing it in readiness for the application of the facing sheet of Fig. 3 thereto.

Figures 2 to 5 inclusive illustrate one manner of constructing a unit of aircraft construction in accordance with the principles of the present invention. Figure 2 illustrates the outside surfacing sheet of a unit intended to form the leading edge of a wing structure. It comprises a metal sheet 17 to the interior face of which a sheet 18 of metal lath is welded at closely spaced intervals throughout the entire area of the sheet 17. The facing sheet thus formed is then bent to approximately the configuration of the outer surface of the unit under construction. The corresponding inner facing sheet is illustrated in Fig. 3. It comprises a metal sheet 19 to the outer surface of which a sheet 21 of metal lath is welded in a similar manner, after which the assembled inner facing sheet is formed to the approximate configuration of the inner surface of the unit of construction being manufactured. Fig. 4 illustrates the outer facing sheet of Fig. 2 with green cement 22 applied to the inner, concave surface thereof in such quantity as to thoroughly embed the metal lath 18 within the semi-fluid cement. After the green cement has been applied in this manner the inner facing sheet of Fig. 3 is applied thereto pressing the metal lath 21 of the inner facing sheet into the grouting 22 with sufficient force to thoroughly embed the metal lath 21 therein and to remove all air from the space between the two sheets 17 and 19 of metal, with the result that the entire space between the two facing sheets 17 and 19 is filled with the cementitious material.

As hereinabove indicated when a unit constructed in this manner extends in a plurality of planes which are disposed angularly with respect to each other, because of the increased moment of inertia of its section. In other words, it is possessed of greater strength for the same reason that great strength lies in a channel section or I-beam section.

Figure 1:
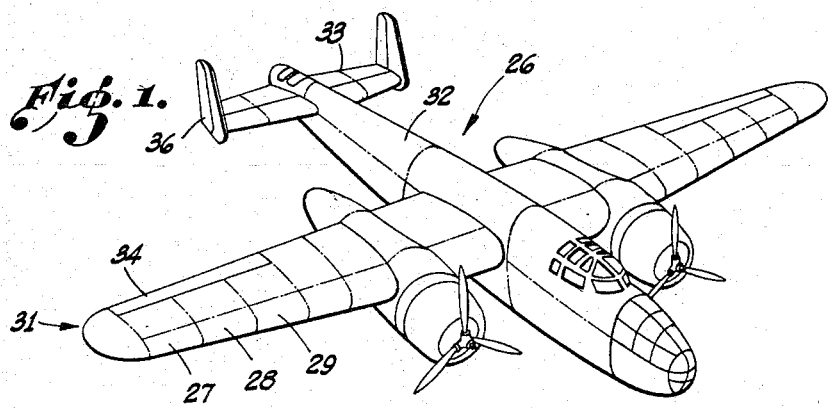
Figure 1 is a perspective view, more or less diagrammatic, of an airplane constructed in accordance with the principles of the present invention by being assembled from a plurality of units each one of which has been constructed in accordance with my present method.

As an example of the manner in which my invention may be put to advantage, Fig. 1 illustrates an airplane 26 wherein three such units 27, 28, and 29 are employed in each of the wings 31. It should be understood however, that numerous other portions of the airplane 26 can also be made advantageously according to the described method, such, for example, as portions of the fuselage 32, the empennage assembly 33, the ailerons and rudders 34 and 36 respectively—in fact I visualize that by slight variation in the described method the present invention can be employed to construct every portion of the fuselage and wing surface of an airplane. As an example of a slight modification that may be employed to adapt my invention to a different form of constructional unit, Figs. 7, 8, and 9 illustrate another method of constructing a wing section. This method employs a jig 41 in order to insure accurate forming of the wing section to the desired configuration. Into the hollow interior 43 of the jig 41 a sheet 43 of surface metal having a sheet 44 of metal lath affixed thereto in the hereinabove described manner is pressed, these sheets 43 and 42 however, being considerably longer than necessary to provide a single layer on the concave surface of the jig 41 thus leaving a considerable excess 46 of the material extending upwards out of the hollow 42. To that portion of the sheet 43 and 44 which line the jig 41 a layer of cementitious grouting 47 is then applied, after which another sheet of metal 48 having metal lath 49 affixed thereto is pressed down upon the grouting in such a manner as to embed the metal lath 49 therein. Here again a considerable excess 51 of the combined sheet of metal and metal lath extend upward from the jig 41. An inside jig 52 is then placed upon the upper surface of the sheet 48 so as to insure accurate shaping of the interior of the ultimate constructional unit being formed. Then the excess 51 of the second sheet of metal 48 and its metal lath 49 are bent down over the top of the inside jig 52 as illustrated in Fig. 8 whereupon grouting 53 is spread over the thus exposed metal lath and the excess 46 of the first sheet 43 and its metal lath 44 are bent downward to embed the lath 44 within the grouting 53. The sheets are then trimmed so as to bring their edges nicely together whereupon a complementary portion 56 of the jig 41 is placed upon the top so as to insure accurate shaping of the exterior surface of the constructional unit being formed. The unit is then permitted to stand until the cementitious material has hardened whereupon the outside jig 41 can be removed, after which the inside jig 52 also is removed which step is facilitated in many instances if the inside jig is made of two parts as illustrated. This manner of construction yields a unitary wing section which is hollow and which is amply strong to fit it for use as a unit of aircraft construction in that it is sufficiently light. Furthermore, no interior bracing is necessary for this type of wing section thus leaving the entire interior of the section available for the reception of gasoline tanks or other storage chambers.

I claim:

1. The method of producing a hollow structural element which includes the steps of forming part of an outer facing sheet having interlocking means on a face thereof to the configuration of the outer face of the finished structural element with said interlocking means facing inward, applying cementitious grouting material thereto, forming part of an inner facing sheet having interlocking means on a face thereof to the configuration of the corresponding part of the inner face of said finished structural element with its interlocking means facing outward and pressing said inner facing sheet onto said grouting to imbed its said interlocking means within said grouting, then forming the remainder of said inner facing sheet to the configuration of the remainder of the inner face of said structural element with its associated interlocking means disposed outwardly, applying cementitious grouting material thereto, and forming the remainder of said outer facing sheet to the configuration of the remainder of the outer face of said structural element and pressing said remainder of said outer facing sheet onto said grouting to imbed its associated interlocking means therein.

2. The method of producing a hollow structural element which includes the steps of forming part of an outer facing sheet to the configuration of part of the outer face of the finished structural element, applying cementitious grouting material thereto to imbed interlocking means on said outer facing sheet within said grouting, forming part of an inner facing sheet to the configuration of the corresponding part of the inner face of said finished structural element and pressing said part of said inner facing sheet onto said grouting to imbed interlocking means thereon into said grouting, then forming the remainder of said inner facing sheet to the configuration of the remainder of the inner face of said structural element, applying cementitious grouting material thereto to imbed interlocking means thereon within said grouting, and forming the remainder of said outer facing sheet to the configuration of the remainder of the outer face of said structural element and pressing said remainder of said outer facing sheet onto said grouting to imbed interlocking means thereon within said grouting.

3. The method of producing a structural element which includes the steps of forming a part of a facing sheet to the configuration of part of one face of said element, applying cementitious grouting material thereto, forming another facing sheet to the configuration of the opposite face of said unit and pressing it onto said grouting, applying grouting to that portion of said other sheet not already covered by grouting, and bending the remainder of said first mentioned facing sheet around said other sheet and forming it to the configuration of the remainder of said outer face of said element and pressing it onto said grouting.

ARTHUR DOHERTY.